(12) United States Patent
Ezawa

(10) Patent No.: US 6,238,103 B1
(45) Date of Patent: May 29, 2001

(54) OPTICAL FIBER CONNECTOR ASSEMBLY

(75) Inventor: Katsuya Ezawa, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

(21) Appl. No.: 09/213,757

(22) Filed: Dec. 17, 1998

(30) Foreign Application Priority Data

Jan. 6, 1998 (JP) .................................................. 10-001055

(51) Int. Cl.[7] .................................................... G02B 6/36
(52) U.S. Cl. .............................................. 385/81; 385/86
(58) Field of Search .................................. 385/81, 78, 76, 385/86, 87

(56) References Cited

U.S. PATENT DOCUMENTS 5,381,500 * 1/1995 Edwards et al. ....................... 385/78
5,668,904 * 9/1997 Sutherland et al. .................... 385/72
5,943,460 * 8/1999 Mead et al. ............................. 385/81

* cited by examiner

*Primary Examiner*—Robert H. Kim
*Assistant Examiner*—Michael P. Stafira
(74) *Attorney, Agent, or Firm*—Kanesaka & Takeuchi

(57) ABSTRACT

An optical connector assembly (1) comprises a ferrule (40) for supporting a fiber element (83) of an optical fiber cable (80), a ferrule holder (50) having an insertion section (52) aligned with the ferrule, a fiber crimper (70) temporarily assembled in the insertion section and then press fitted to fix the fiber element at the first predetermined area; and a cable holder (60) temporarily assembled in the insertion section and then press fitted to fix the fiber cable at the second predetermined area.

6 Claims, 10 Drawing Sheets

OPTICAL FIBER CONNECTOR ASSEMBLY

BACKGROUND OF THE INVENTION

1. Field of the Invention

The present invention relates to optical fiber connector assemblies for connecting optical fiber cables and, particularly, to an optical fiber connector assembly to which an optical fiber cable is fixed later to complete an optical fiber connector assembly.

2. Description of the Related Art

Most of the conventional optical fiber connector assemblies require a bonding agent to assemble them in the field and have disadvantages in terms of environment and the number of manufacturing steps. The assemblers demand simpler and fewer manufacturing steps. There are some optical fiber connectors preassembled by optical fiber connector manufactures.

For example, Japanese patent application Kokai No. 7-248433 discloses a push-pull or SC type optical fiber connector. Two such connectors are connected through an adaptor type connector. It is easy to fix an optical fiber to the connector to complete the assembly without any bonding agent.

In the above connector, an optical fiber is fixed at two points by an elastic insert and a collapsible plunger. The elastic insert consists of three elastic balls of the substantially same diameter and placed behind the ferrule. The elastic balls are fitted into a narrow space to fix the fiber element. The collapsible plunger is made as an elongated cylinder and placed behind the elastic insert. The collapsible plunger is then fitted into a narrow cylindrical space so that projections of the collapsible plunger collapse to fix the optical cable.

In the above connector, however, the elastic insert for fixing the fiber element is prone to thermal deformation so that the optical cable is moved in the axial direction. That is, when the ambient temperature changes, the gripping power over the optical cable is lowered because of a difference in thermal expansion between the elastic insert and the optical cable so that the optical cable tends to move in the axial direction. Consequently, the position of the optical cable at the front end of the ferrule is shifted, resulting in the poor optical connection characteristics. (This is called "insertion loss change.") This insertion loss change is a factor to cause a connection loss of the optical cable. In the above example, the optical cable is fixed at points so that the fixation is unstable. That is, the elastic insert is spherical so that when it is shrunk, the fiber element contacts the balls at small areas. In addition, the projections behind the collapsible plunger occupy only a mere portion so that when the projections are collapsed, the areas that the optical cable abuts on the collapsed projections are small. Consequently, the fixing strength of the optical cable is low. Moreover, there is a large distance between the elastic insert and the collapsible plunger so that the thermal change of the jacket for the optical cable between them is very high, resulting in the weak optical cable and reducing the usable temperature range.

SUMMARY OF THE INVENTION

Accordingly, it is an object of the invention to provide an optical connector assembly with a support member having a low thermal expansion coefficient.

It is another object of the invention to provide an optical connector assembly with a large area to stabilize the fixation of an optical cable.

It is still another object of the invention to provide an optical connector assembly with the fixing areas so close to each other that the thermal contraction or expansion of the optical cable is small.

It is yet another object of the invention to provide an optical connector assembly to which an optical cable is fixed from the side opposite to the ferrule.

According to one aspect of the invention there is provided an optical fiber connector assembly which comprises a ferrule for supporting an optical fiber element of an optical fiber cable; a ferrule holder having an insertion section aligned with the ferrule; a fiber crimper fitted into the insertion section to fix the optical fiber element at a first predetermined area; and a cable holder fitted into the insertion section to fix the optical fiber cable at a second predetermined area.

It is preferred that the first and second predetermined areas are provided in proximity.

According to another aspect of the invention there is provided an optical fiber connector assembly which comprises a ferrule for supporting a front portion of an optical fiber element; a ferrule holder integral with the ferrule and having a first insertion section aligned with the ferrule and a second insertion section having an inside diameter smaller than the first insertion section; a fiber crimper temporarily assembled in the first insertion section and then fitted into the second insertion section to reduce an inside diameter of the fiber crimper for fixing the optical fiber element in a first predetermined area; a cable holder with a front portion temporarily assembled in the first insertion section and then further fitted into the first insertion section to reduce an inside diameter of the cable holder for fixing the optical fiber cable in a second predetermined area, wherein the fiber element is inserted into the cable holder, the fiber crimper, and the ferrule, the fiber crimper is further inserted into the first insertion section while the fiber crimper is inserted into the second insertion section so that the fiber element and the fiber cable are fixed by the fiber crimper and the cable holder, respectively, at areas which are close to each other and have predetermined lengths.

It is preferred that the ferrule and the fiber crimper is formed from a material having a low thermal expansion coefficient. Preferably, the ferrule is made from a resin. Preferably, the ferrule and the ferrule holder are made as a unit. Preferably, the fiber crimper and the cable holder are made as a unit.

It is preferred that the optical fiber connector assembly further comprises a plug frame with a passage opening for supporting the ferrule or the ferrule holder; a spring member for forwardly urging the ferrule; and a device for supporting the spring member.

DESCRIPTION OF THE PREFERRED EMBODIMENT

Figure 1:
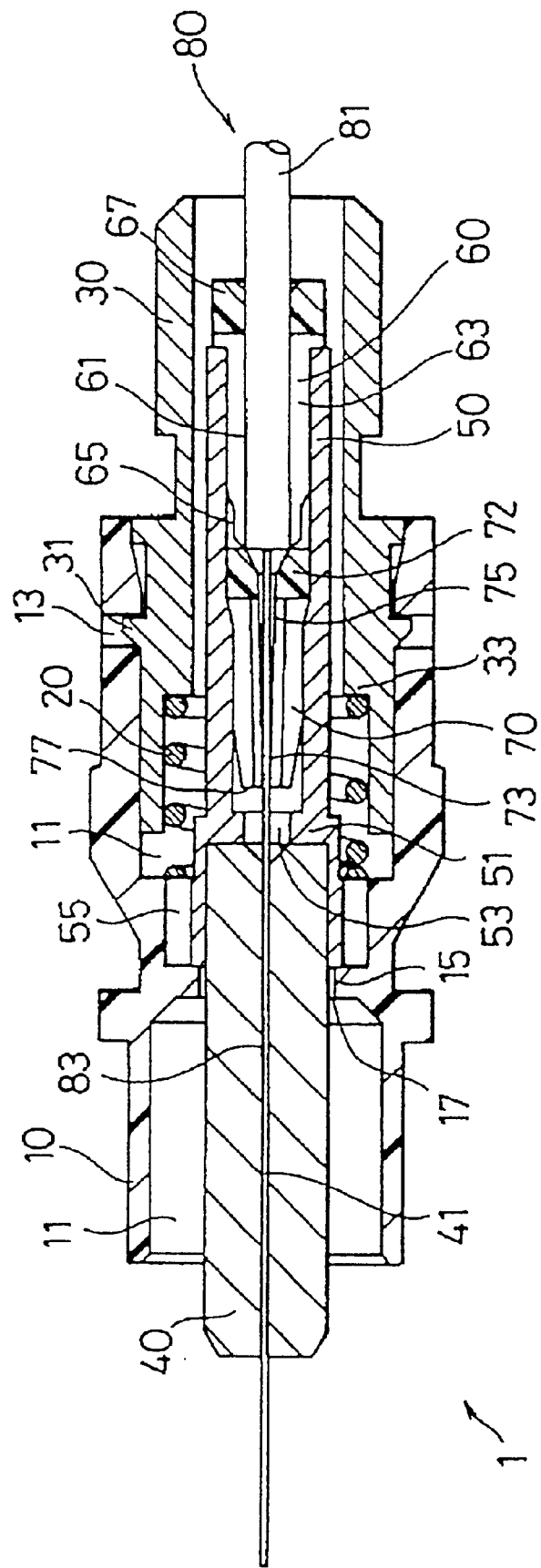
FIG. 1 is a longitudinal section of an optical fiber connector assembly according to the first embodiment of the invention.
Figure 2:
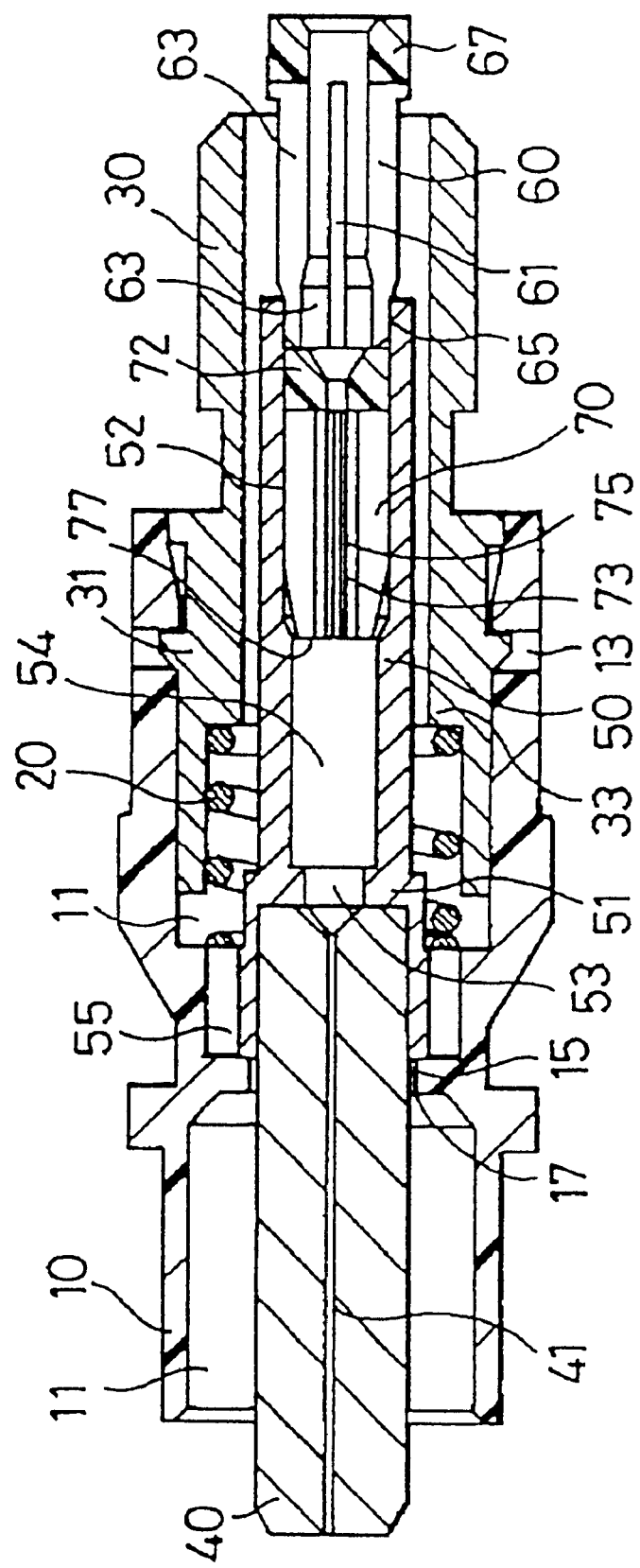
FIG. 2 is a longitudinal section of the optical fiber connector assembly at a time of shipment.

A first embodiment of the invention will be described below with reference to the accompanying drawings, wherein FIG. 1 is a longitudinal section of an optical fiber connector assembly according to the first embodiment and FIG. 2 is a longitudinal section of the optical fiber connector assembly at the time of shipping (this figure corresponds to the step in FIG. 4(b)). As shown in these figures, an optical fiber connector assembly 1 comprises a plug frame 10, a spiral spring 20, a stop ring 30, a ferrule 40, a ferrule holder 50, a cable holder 60, a fiber crimper 70, and a fiber cable 80.

The plug frame 10 is fixed to an SC type connector housing (not shown) to form an SC type connector. The SC type connector is plugged to an SC type adaptor connector to receive signals. The plug frame 10 is made substantially cylindrical and has an opening 11 in which the ferrule 40 and the ferrule holder 50 are placed. The plug frame 10 has an inner flange 15 having a through-hole 17 through which the ferrule 40 is put. The through-hole 17 has a diameter large enough to allow passage of the ferrule 40 but too small to allow passage of the ferrule holder 50. The ferrule holder 50 abuts against the inner flange 15 so that the ferrule 40, which is fixed to the ferrule holder 50, does not fall from the front end of the plug frame 10.

The stop ring 30 is made substantially cylindrical and is fixed to the plug frame 10 on the front side to provides an open passage in which the ferrule 40 and the ferrule holder 50 is placed. In order to fix the stop ring 30 to the plug frame 10, a plurality of snap holes 13 are provided in the rear portion of the plug frame 10 and, in the front portion of the stop ring 30, a plurality of projections 31 are provided for engagement with the snap holes 13. A front shoulder 33 is provided at the front portion of the stop ring 30 to support the spiral spring 20 within the open passage. The front end of the spiral spring 20 abuts against the rear protuberance 55 of the ferrule holder 50 to urge the ferrule holder 50 and ferrule 40 against the plug frame 10 so that the front end of the ferrule 40 projects from the plug frame 10.

The ferrule 40 has a thin through-hole 41 and supports a fiber element 83 or a portion of a fiber cable 80 from which a jacket 81 has been removed. Only the ferrule 40 and the fiber crimper 70 directly support the fiber element 83. As described above, the front end of the ferrule 40 is projected from the plug frame 10 for plugging to the adaptor while the rear portion of the ferrule 40 is fixed by the ferrule holder 50. As described below, the ferrule 40 and the ferrule holder 50 may be molded integrally as a unit. The material of the ferrule 40 is zirconia which is so low in thermal expansion coefficient that the amount of contraction or expansion due to temperature changes of the fiber element 83 is negligible.

Like the plug frame 10 and the stop ring 30, the ferrule holder 50 is made substantially cylindrical. The ferrule holder 50 has a partition wall 51 having a through-hole 53. The rear end of the ferrule 40 is inserted into the ferrule holder 50 until it abuts against the partition wall 51 to fix the ferrule 40 to the ferrule holder 50. The fiber crimper 70 and the cable holder 60 are inserted into the ferrule holder 50 from back to temporarily assemble these elements in the ferrule holder 50. The ferrule 40 and the ferrule holder 50 may be molded integrally as a unit. The material of the ferrule holder 50 is a metal or resin such as a plastic. Where a metallic ferrule holder 50 is used, the ferrule 40 is press fitted into the ferrule holder 50 while a plastic ferrule holder 50 may be molded integrally with the ferrule 40. The thermal expansion coefficients of these metal and resins are lower than that of rubber so that the insertion loss change is low.

The fiber cable 80 consists of the fiber element 83 and the jacket 81. A length of jacket 81 is removed from a front portion of the fiber cable 80 to expose the fiber element 83. The front and rear portions of the exposed fiber element 83 are supported by the ferrule 40 and the fiber crimper 70, respectively. The excess portion of the fiber element 83 is cut off at the front end of the ferrule 40, and the front end of the fiber element 83 is polished. A length of the fiber cable 80 from the front end of the jacket 81 is fixedly held by the cable holder 60.

Figure 3C:
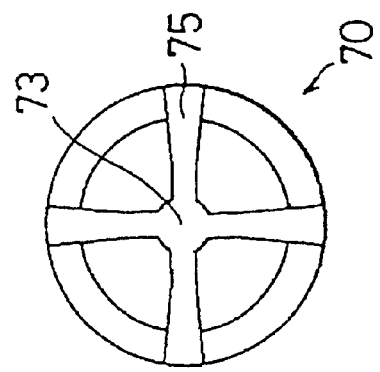
FIGS. 3(a)–(c) are front views of each fiber crimper.
Figure 3B:
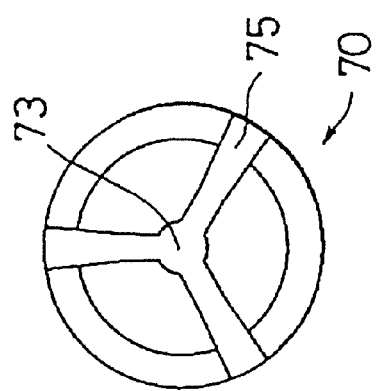
Figure 3A:
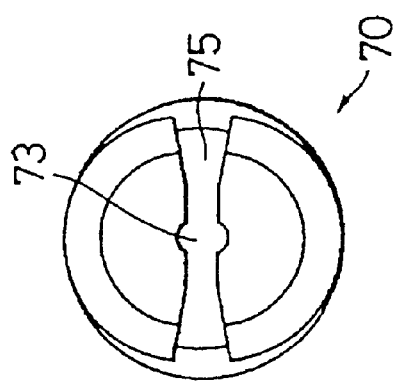

The fiber crimper 70 has a thin through-hole 73 for receiving the fiber element 83. The front end 77 of the fiber crimper 70 is tapered but the remaining portion has the same diameter. See FIG. 3(a) for the front view of the fiber crimper 70. A pair of slits 75 extends to the front end 77 from the rear end portion 72 of the fiber crimper 70 to increase the diameter of the through-hole 73 but prevent the fiber cable 80 from passing the through-hole 73. When the slits 75 are closed, a complete through-hole 73 is formed at the center. The diameter of the through-hole 73 is made slightly less than the diameter of the fiber element 83 to be able to fix the fiber element 83 in place. The slits 73 are not completely closed near the rear end portion 72 but this portion is so short that it has no adverse influence on the fixing power. Other examples of the fiber crimper 70 are shown in FIGS. 3(b) and (c). These fiber crimper 70 are different from that of FIG. 3(a) with respect to the slits 75. That is, three and four slits 75 are provided in FIGS. 3(b) and (c), respectively. The functions of these slits 75 are the same as those of FIG. 3(a). In this way, the fiber crimper 70, has the through-hole 73 in which the fiber element 83 is held under pressure. The preferred material for the fiber crimper 70 is a metal or resin, such as a plastic, which has a low thermal expansion coefficient. The fiber crimper 70 is temporarily assembled in the ferrule holder 50 when the optical connector is shipped to the installer (FIG. 2).

Like the fiber crimper and ferrule 40, the cable holder 60 has a central thin through-hole 61. Like the fiber crimper 70, the cable holder 60 is tapered at the front portion 65 and the remaining section has the same diameter except for the rear portion 67. It receives the fiber cable 80 and fixes it in place. It is divided into six resilient portions 63 extend forwardly from the rear portion 67. (In FIG. 2, four resilient portions 63 are shown by moving the sectional plane with respect to the central sectional plane.) The number of the resilient portions 63 may be changed. The cable holder 60 fixes the fiber cable 80 by the six resilient portions. The preferred material for the cable holder 60 is a resin, such as a plastic, which has a low thermal expansion coefficient. The cable holder 60 is temporarily assembled in the ferrule holder 50 at the front portion 65 when the optical connector is shipped to the installer.

How to fix the fiber cable to the connector will be described with reference to FIGS. 4(a)–(d).

Figure 4A:
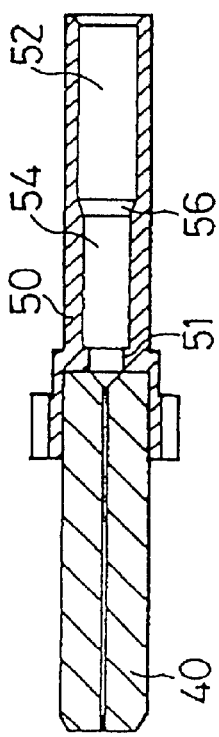
FIGS. 4(a)–(d) are schematic diagrams showing each step of assembling the optical fiber connector assembly.

FIG. 4(a) shows the fiber crimper and the cable holder before temporary assembling; FIG. 4(b) shows the fiber crimper and the cable holder assembled in the ferrule holder; FIG. 4(c) shows the fiber cable inserted into the cable holder, the fiber crimper, and the ferrule; and FIG. 4(d) shows the fiber crimper and the cable holder press fitted to fix the fiber cable by means of the fiber crimper and the cable holder.

Before respective steps are described, the dimension of the ferrule holder 50, the fiber crimper 70, and the cable holder 60 will be described.

As shown in FIGS. 4(a)–(d), the rear cylindrical section from the partition wall 51 of the ferrule holder 50 has first and second insertion portions 52 and 54. The linking portion 56 between the insertion portions is tapered from the insertion portion 52 to the insertion portion 54. The sum of the length of the first insertion portion 52 and the length of the linking portion 56 is substantially equal to the sum of the length of the fiber crimper 70 and the length of the front end portion 65 while the length of the second insertion portion 54 is slightly larger than the length of the slits 75 of the fiber crimper 70.

The diameter of the first insertion portion 52 is larger than the diameter of the second insertion portion as described in detail below. The inside diameter of the first insertion portion 52 is substantially equal to the maximum outside diameter of the fiber crimper 70 before the slits 75 are closed so that the fiber crimper 70 can be inserted in the first insertion portion 52 without closing the slits 75. The inside diameter of the first insertion portion 52 is large enough to receive the front end 65 of the cable holder 60 without narrowing the resilient portions 63. The cable holder 60 cannot be inserted into the first insertion portion 52 without narrowing the resilient portions 63. That is, it is inserted into the first insertion portions 52 by narrowing the resilient portions 63. The rear end portion 67 cannot be fitted into the first insertion portion 52 even if the resilient portions 63 are narrowed.

The inside diameter of the second insertion portion 54 is larger than the outside diameter of the front end 77 of the fiber crimper 70 before the slits 75 are closed, so that the front end 77 of the fiber crimper 70 can be inserted into the second insertion portion 54 without closing the slits 75. The other portions than the front end 77 cannot be inserted into the second insertion portion 54; that is, it can be inserted into the second insertion portion 54 by closing the slits 75. The rear end portion 72, on which no slits 75 are provided, cannot be inserted into the second insertion portion 54 even if the slits 75 are closed.

Figure 4B:
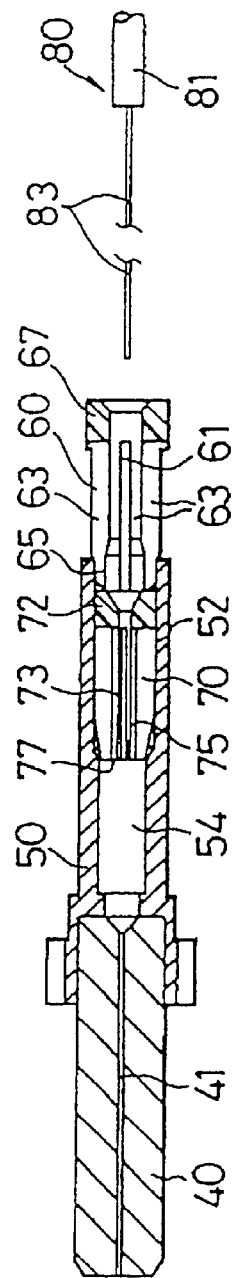
Figure 4C:
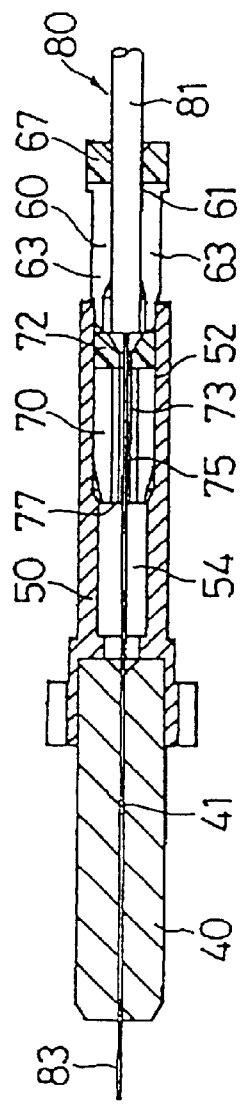
Figure 4D:
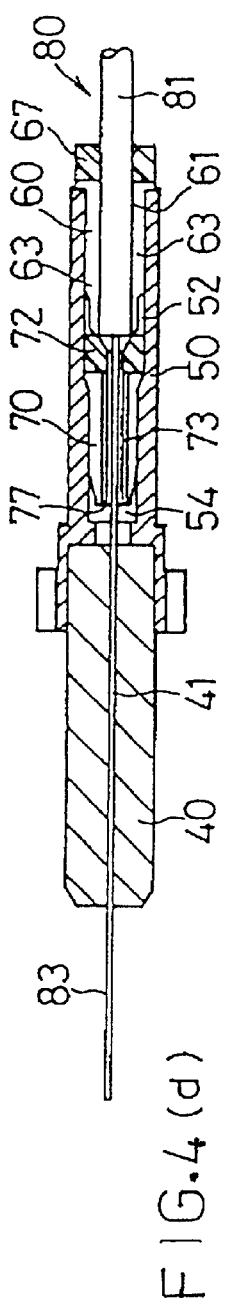

The fiber crimper 70 and the cable holder 60 are inserted into the ferrule holder 50 and temporarily assembled as shown in FIG. 4(b) wherein the rear end of the fiber crimper 70 abuts against the front end of the cable holder 60. The fiber crimper 70 is assembled in the rear section of the ferrule holder 50 without closing slits 75 while only the front end 65 of the cable holder 60 is inserted in the rear section of the ferrule holder 50.

Then, the fiber element 83 is inserted through the through-holes 61, 73, and 41 of the cable holder 60, the fiber crimper 70, and the ferrule 40, respectively, as shown in FIG. 4(c) so that the front end thereof projects from the ferrule 40. The fiber cable 80 with the jacket 81 is inserted through the through-hole 61 of the cable holder 60 but stopped at the through-hole 73 of the fiber crimper 70 because of the presence of the jacket 81.

Then, the cable holder 60 is press fitted into the first insertion section 52 with a tool (not shown) to fix the cable holder 60, the fiber crimper 70, and the fiber cable 80 in place in the ferrule holder 50 as shown in FIG. 4(d). It is unlikely that the fiber element 83 is broken during the assembling because the cable holder 60 is fitted into the ferrule holder 50 from back. As the cable holder 60 is fitted into the first insertion section 52, the fiber crimper 70 is fitted into the second insertion section 54. As the cable holder 60 and the fiber crimper 70 are fitted into the insertion sections, the slits 75 of the cable holder 60 and the resilient portions 63 of the fiber crimper 70 are closed to hold the fiber cable 80 and the fiber element 83, respectively. Finally, the cable holder 60 and the fiber crimper 70 are fitted into the first insertion section up to the resilient portions 63 and the second insertion section up to the slits 75, respectively. Consequently, the cable holder 60 and the fiber crimper 70 fixedly hold the fiber cable 80 over almost the entire length of the resilient portions 63 and the fiber element 83 over almost the entire length of the slits 75, respectively.

Since the fiber cable 80 and the fiber element 83 are fixed by the cable holder 60 and the fiber crimper 70, respectively, over the predetermined lengths, the fiber cable 80 is fixed completely in the ferrule holder 50. The position of the fiber cable 80 fixed by the cable holder 60 is so close to the position of the fiber element 83 by the fiber crimper 70 that the insertion loss change is low with respect to the thermal expansion or contraction of the jacket 81, thus maximizing the usable temperature range of the optical connector. No adhesive is required to fix the fiber cable 80. The fiber element 83 is polished after cutting with a tool.

Figure 5:
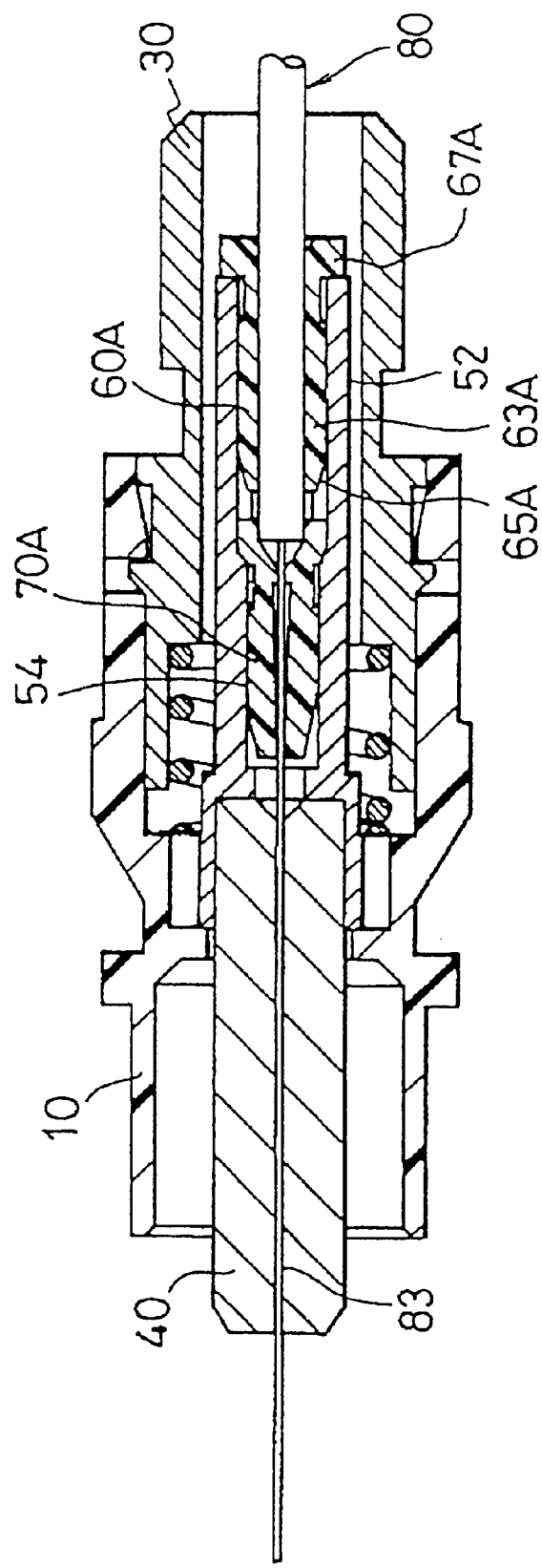
FIG. 5 is a longitudinal section of an optical fiber connector assembly according to the second embodiment of the invention.
Figure 6:
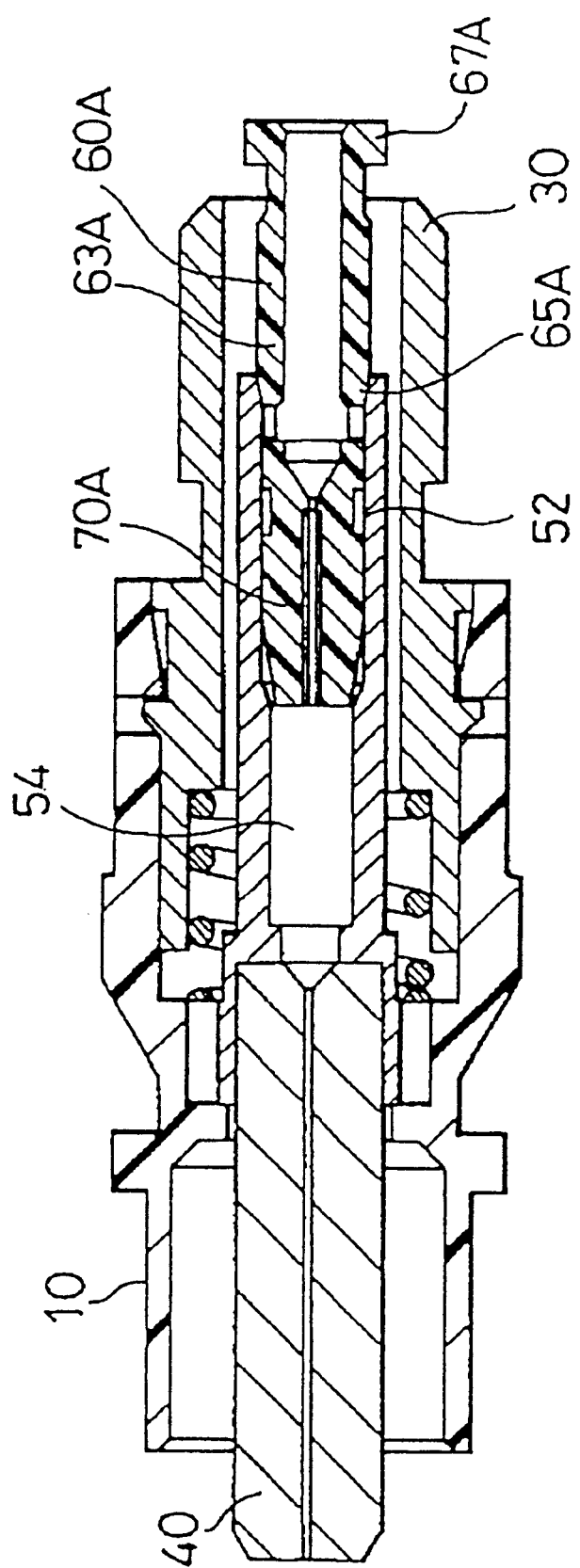
FIG. 6 is a longitudinal section of the optical fiber connector in which the fiber crimper and the cable holder are temporarily assembled in the ferrule holder.

The second embodiment of the invention will be described with respect to FIGS. 5 and 6, which correspond to FIGS. 1 and 2 of the first embodiment. That is, FIG. 5 is a longitudinal section of an optical connector according to the second embodiment and FIG. 6 shows the fiber crimper and the cable holder temporarily incorporated in the ferrule holder. The second embodiment is different from the first embodiment only in that the fiber crimper 70A and the cable holder 60A are molded integrally as a unit.

In FIGS. 5 and 6, the fiber crimper 70A and the cable holder 60A are molded as a unit. The resilient portions 63A of the cable holder 60 are formed by making slits which extend rearwardly from the front end. Four slits are provided in a crisscross fashion in the cable holder 60A to form four cantilevered resilient portions 63A. The number of resilient portions 63A may varies. The maximum outside diameter of the resilient portions 63A is made larger than that of the section other than the front and rear end portions 65A and 67A of the cable holder 60A. As in the first embodiment, the maximum outside diameter of the resilient portions 63A is larger than the inside diameter of the first insertion section 52, and the cable holder 60A can be fitted into the first insertion section 52 only when the cable holder 6OA is fitted into the first insertion section 52 to narrow the resilient portions 63A. In this embodiment it is possible to fit the cable holder 60A and the fiber crimper 70A into the first and second insertion sections 52 and 54, respectively. The manufacturing cost is minimized by the integral molding of the cable holder 60A and the fiber crimper 70A. The preferred material for the cable holder 60A and fiber crimper 70A is a plastic which has a low thermal expansion coefficient and is flexible.

Figure 7:
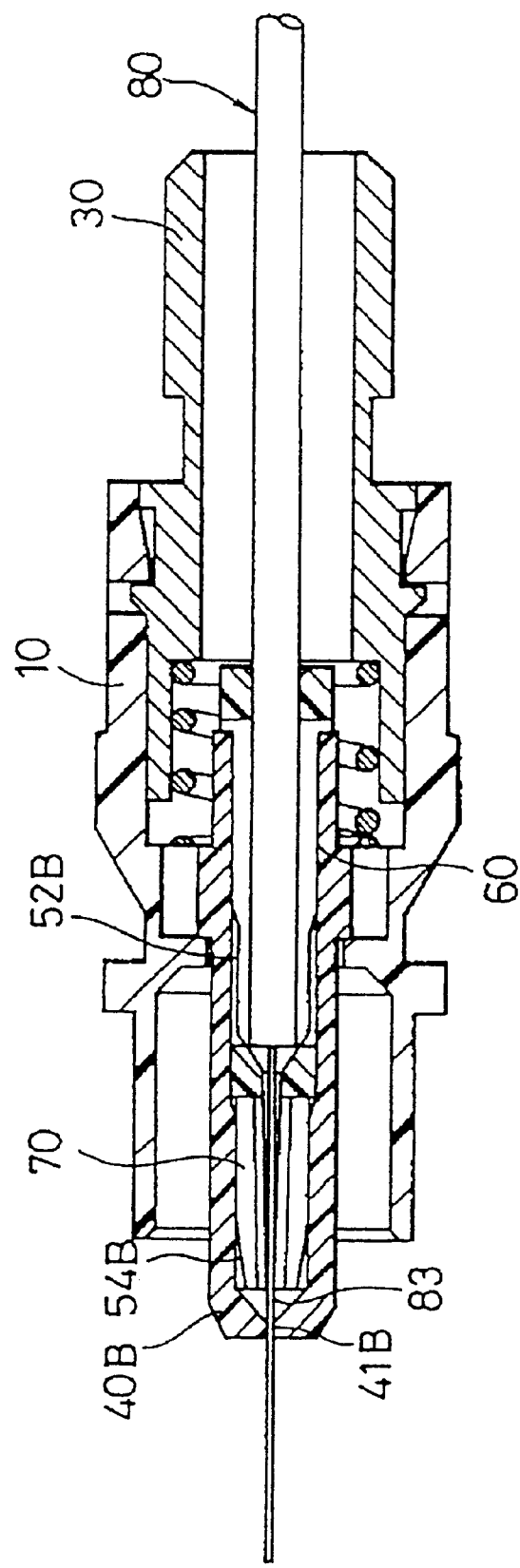
FIG. 7 is longitudinal section of the optical fiber connector assembly according to the third embodiment of the invention.
Figure 8:
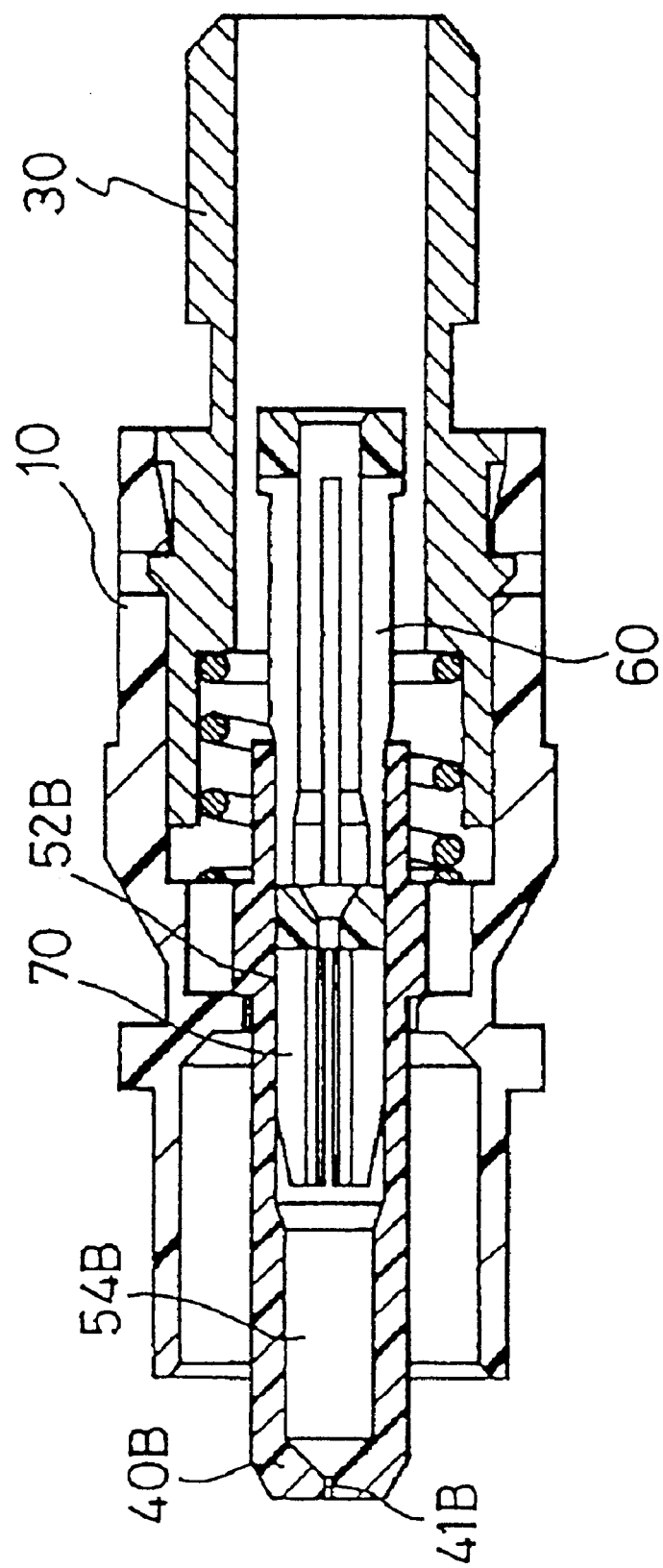
FIG. 8 is a longitudinal section of the optical fiber connector assembly in which the fiber crimper and the cable holder are temporarily assembled in the ferrule holder.

The third embodiment of the invention will be described with respect to FIGS. 7 and 8, which correspond to FIGS. 1 and 3. FIG. 7 is a longitudinal section of an optical fiber connector according to the third embodiment and FIG. 8 shows the fiber crimper and the cable holder assembled in the ferrule holder. The third embodiment is different from the first embodiment only in the material for the ferrule and ferrule structure.

Unlike the first embodiment, the material for the ferrule 40B is a resin such as a plastic. In the resinous ferrule 40B, it is impossible to make such a long through-hole as in the ferrule 40 of metal or zirconia so that the through-hole 41B is shorter than the through-hole 41 of the ferrule 40. Where the through-hole is not made precisely, the optical loss at a point where the ferrule is coupled to the adaptor is considerable. Consequently, the length of the through-hole 41B in the ferrule 40B is made much less than that of the first embodiment. Since the through-hole 41B is so short that a cylindrical space can be formed to accommodate the fiber crimper 70 and the cable holder 60, thus eliminating the need for the ferrule holder as in the first embodiment. The ferrule 40B is provided with two support members 52B and 54B which are similar to those of the ferrule holder 50 and to which the fiber crimper and the cable holder 60 are fixed by the same way as in the first embodiment. The use of a resin for the ferrule 40B reduces the material cost and eliminates the need for the ferrule holder, minimizing the manufacturing cost.

Figure 9:
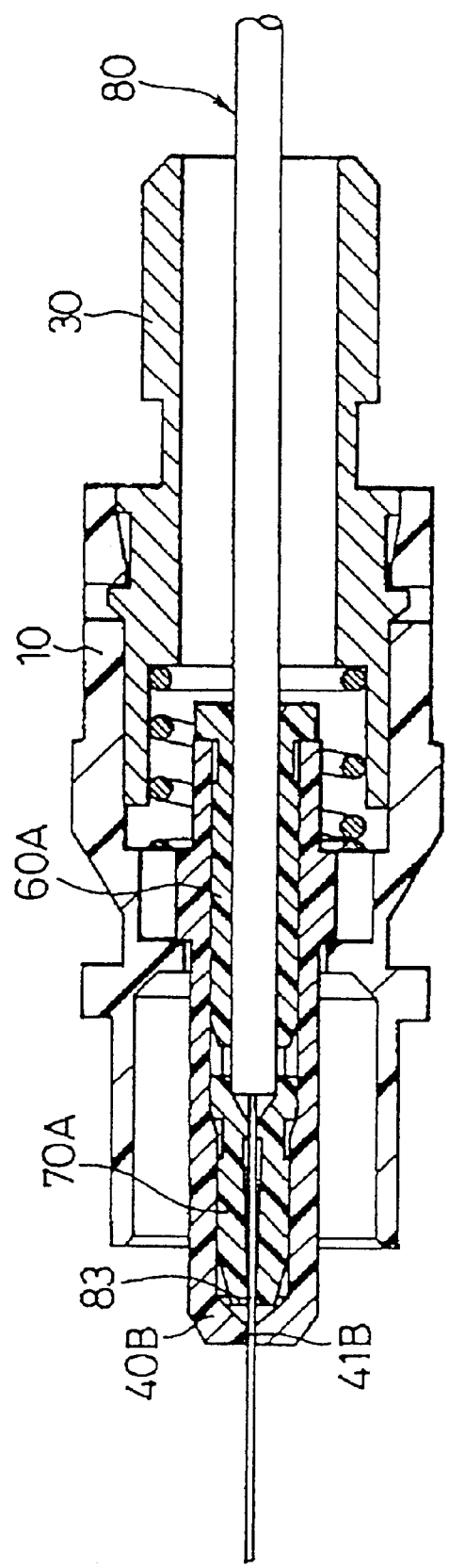
FIG. 9 is a longitudinal section of an optical fiber connector assembly according to the fourth embodiment of the invention.
Figure 10:
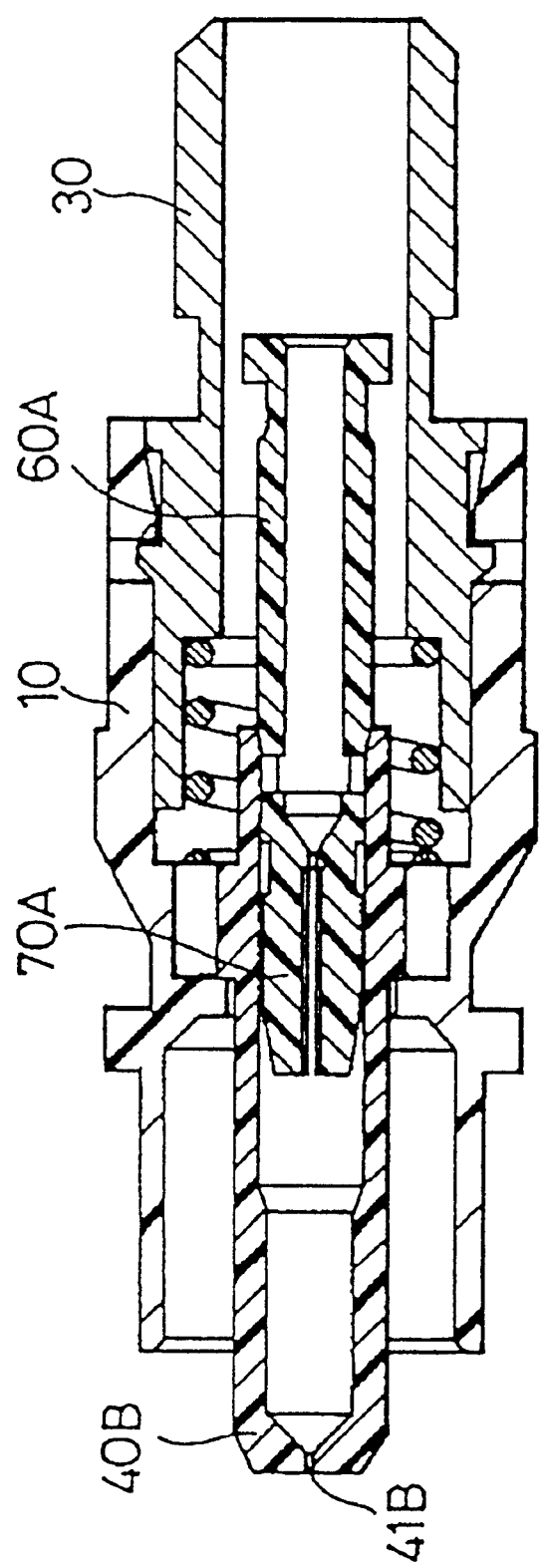
FIG. 10 is a longitudinal section of the optical fiber connector of FIG. 9 in which the fiber crimper and the cable holder are temporarily assembled in the ferrule holder.

The fourth embodiment of the invention will be described with reference to FIGS. 9 and 10. FIG. 9 is a longitudinal section of an optical fiber connector according to the fourth embodiment and FIG. 10 shows the fiber crimper and the cable holder temporarily assembled in the ferrule holder. The fourth embodiment is a combination of the second and third embodiments. That is, the cable holder 60A and the fiber crimper 70A are molded as a unit as in the second embodiment and the ferrule is made from a plastic and has a short through-hole 41B and a cylindrical space to accommodate the fiber crimper 70A and the cable holder 60A. The structure of the fourth embodiment is apparent from those of the second and third embodiments, and the detailed description will be omitted. The fourth embodiment makes more economical connector possible.

The optical fiber connector according to the invention can be assembled by simply inserting an optical fiber into the connector. The ferrule and the fiber crimper are made from a material having a low thermal expansion coefficient so that the insertion loss change or movement of the fiber element in the ferrule is minimized. The points where the fiber cable is fixed are so close that the effects of thermal movement of the fiber cable is minimized, thus maximizing the useful thermal range of the optical fiber. The optical fiber connector according to the invention is resistant against the thermal change.

The fiber cable is fixed at a plurality of long areas so that the fixation of the fiber cable is stable. The fiber cable is inserted into the connector assembly from back so that there is little danger that the fiber element is broken during the insertion.

What is claimed is:

1. An optical fiber connector assembly comprising:

a ferrule for supporting a front portion of an optical fiber element;

a ferrule holder integral with said ferrule and having a first insertion section aligned with said ferrule and a second insertion section having an inside diameter smaller than said first insertion section;

a fiber crimper temporarily assembled in said first insertion section and then fitted into said second insertion section to reduce an inside diameter of said fiber crimper for fixing said optical fiber element in a first predetermined area;

a cable holder with a front portion temporarily assembled in said first insertion section and then further fitted into said first insertion section to reduce an inside diameter of said cable holder for fixing said optical fiber cable in a second predetermined area, wherein said fiber element is inserted into said cable holder, said fiber crimper, and said ferrule, and said cable holder is further inserted into said first insertion section while said fiber crimper is inserted into said second insertion section so that said fiber element and said fiber cable are fixed by said fiber crimper and said cable holder, respectively, at areas which are close to each other and have predetermined lengths.

2. An optical fiber connector assembly according to one of claims 1, wherein one of said ferrule and said fiber crimper is formed from a material having a low thermal expansion coefficient.

3. An optical fiber connector assembly according to claim 2, wherein said ferrule is made from a resin.

4. An optical fiber connector assembly according to claim 3, wherein said ferrule and said ferrule holder are made as a unit.

5. An optical fiber connector assembly according to one of claims 1 and 3–4, wherein said fiber crimper and said cable holder are made integrally as a unit.

6. An optical fiber connector assembly according to one of claims 1 and 3–4, which further comprises:

a plug frame with a passage opening for supporting said ferrule or said ferrule holer;

spring means for forwardly urging said ferrule; and support means for supporting said spring means.

* * * * *